Patented Feb. 7, 1933

1,896,185

UNITED STATES PATENT OFFICE

HAROLD O. NOLAN, OF NEW YORK, N. Y., ASSIGNOR OF ONE-THIRD TO ELLIS-FOSTER COMPANY, OF MONTCLAIR, NEW JERSEY, A CORPORATION OF NEW JERSEY

MARINE OIL PRODUCT AND PROCESS OF MAKING SAME

No Drawing. Application filed August 4, 1927. Serial No. 210,727.

This invention relates to a marine oil product and process of making same.

Since the discovery that cod liver oil is rich in the accessory food factors now called vitamin A and vitamin D, the use of this oil has increased considerably, especially in malnutrition and in the prevention and cure of rickets. The use has been handicapped by the fishy odor or flavor, popularly, but not quite correctly called "taste". Up to the present no satisfactory method has been known whereby without sacrifice of other desired properties, this flavor may be eliminated or sufficiently mitigated to render the product palatable. Shuck (U. S. Patent 1,260,072) claims that by treating marine oils with hydrogen, without a catalyst, at 300° C. he obtains a deodorization, but this treatment destroys the vitamins. Ordinary catalytic hydrogenation also deodorizes the oil with destruction of the vitamins. Furthermore, the latter process denatures the oil by converting the highly unsaturated glycerides into more nearly saturated fats. This is a disadvantage because it is believed that part of the virtue of cod liver oil as a remedial agent in malnutrition resides in its content of glycerides of highly unsaturated fatty acids.

The object of my invention is first, to render palatable and to extend the usefulness of cod liver oil and other marine animal oils by removing the fishy odor or flavor, or reducing it to a negligible quantity, without substantially impairing the vitamin potency and without unduly reducing the content of highly unsaturated glycerides, and second, to produce, by utilizing this improved oil, new products of thereapeutic and nutritional value.

Whenever, in this specification, I use the expression "deodorized oil", I mean thereby an oil whose fishy flavor has been abolished, or is present only in a negligible degree.

One way which I have found for accomplishing this end is to treat the oil with hydrogen, in presence of a hydrogenation catalyst, at temperatures and pressures and for a length of time which neither destroy the vitamins nor cause substantial hydrogenation of the oil. There is advantage in using catalysts which are active at relatively low temperatures (e. g., below 80° C.) because, although, in almost all cases, a satisfactory degree of deodorization is attained before the vitamins are substantially attacked or a serious degree of hydrogenation of the desirable highly unsaturated glycerines occurs, nevertheless, the control of this operation, where the permissible time is short, is not easy and the short safe period may be overstepped.

As an example, I will explain how I accomplish my object using palladium as a catalyst. This may be prepared in any manner which yields an active catalyst that can be readily separated from the oil after treatment. I have obtained favorable results from the palladium black catalyst prepared by reduction of palladous oxide according to the methods described by Roger Adams and his collaborators (Journal of the American Chemical Society 46, 1683, 1924). By preference I effect the reduction of the oxide in a highly refined liquid paraffin of the medicinal type, because this vehicle is tasteless, odorless, colorless, chemically indifferent and readily separated from the palladium.

The proportion of catalyst to oil may vary within wide limits, the choice, with any given specimen of catalyst, being chiefly a matter of time economy. The rapidity of deodorization is, apparently, a function of the concentration of active catalyst. The activity can be evaluated by actual trial. I have successfully used 2 parts by weight of palladium, to 100 parts of oil, passing hydrogen at 40° C. for 3 hours. Also, I have used the proportions of 1 of palladium to 500 of oil at 40° C. and have obtained satisfactory deodorization in 6 hours. I have used as little as 1 part of palladium to 3000 parts of oil with success as regards deodorization, but the operation is slow and there is a tendency to peptization of the catalyst with consequent difficulty in separating it from the oil at the conclusion of the operation.

Cod liver oils vary much in their odor and, therefore in their resistance to deodorization, as measured by the concentration of catalyst and the length of time. Higher temperatures, up to any rate, 70° C. may be used with gain of time. There is at these higher temperatures a tendency to the development of new and disagreeable flavors and to peptization of the catalyst. Such higher temperatures should be used only after a trial run with the particular oil and catalyst involved. The catalyst may be borne on a support such as asbestos or pumice, but the support material should preferentially be one which does not adsorb the vitamins.

With average oils and average catalyst I prefer to operate as follows:—

1 part of catalyst is added to 200 parts of oil and the whole heated to 40° C. in a brisk current of hydrogen at atmospheric pressure until a satisfactory degree of deodorization is attained. This usually takes 3 to 4 hours. The oil should preferably be allowed to cool in a current and not merely a quiescent atmosphere of carbon dioxide. In these conditions there is little danger in over-prolongation of the treatment. Objectionable odors and tastes do not develop and, if solid fats are formed, these may be removed by chilling.

There is sometimes advantage in operating under diminished pressure to inhibit the development of undesirable flavors. Palladium lends itself to this kind of procedure. Thus, in one instance 280 parts by weight of an oil carrying a strong fishy odor were placed in a reaction vessel with 1 part of palladium. Hydrogen was passed for 5 hours at pressures between 10 and 15 millimeters of mercury, (610-660 centimeters vacuum) the temperature being 60° C. The product, cooled in a brisk current of carbon dioxide, was satisfactorily deodorized, deposited no solid glycerides on chilling, and carried no trace of "hydrogenation odor". Palladium presents other advantages, notably its activity at low temperatures and in low concentrations. Also the ease with which it can be completely removed from the oil recommends it for use in the preparation of medicinal and food oils. Nevertheless, any hydrogenation catalyst may be used, provided that it exhibits adequate activity within the permissible time-temperature limits set by the instability of the vitamins. Thus, platinum black will serve in substantially the same manner as palladium, actual test in each case readily establishing the optimum conditions. With base metal catalysts, such as nickel or copper-nickel, the action at low temperatures and ordinary pressures is slow. Operation under high pressures and at a temperature of about 70° C. therefore is recommended. Active catalysts of this class may be used in a special modification of the method: The oil agitated with the catalyst is rapidly raised to 160° C. in an atmosphere of hydrogen and as soon as deodorization is sufficient, which should take place in ten to fifteen minutes, it is cooled as rapidly as possible in an atmosphere of carbon dioxide. This short exposure does not destroy the vitamins and produces a satisfactory diminution of the fishy odor.

This modification of my process is better adapted for treatment of marine oils whose vitamins are unimportant than of cod liver oil. This is because, although experience has shown that deodorization occurs before destruction of the vitamins, the time of operation is short and the margin of safety small.

In all cases it is preferable to stop the operation as soon as sufficient deodorization has occurred. Otherwise, there may occur development of hydrogenation odors which are difficult to remove from an oil containing the vitamins.

Whatever catalyst is used, it is advisable to shorten as much as possible the time of its contact with the deodorized oil. Separation is preferably effected by centrifugal action, rather than by filtration, because many filtering materials adsorb the vitamins. The so-treated cod liver oil product should be clear and of a brilliant yellow color. A brown or orange shade is usually indicative of colloidal catalyst. Coarser catalyst, merely suspended mechanically, gives a grey-green cast to the color. This can be removed by passage through a high-speed centrifugal separator.

Throughout all these operations precautions are desirably taken to reduce to a minimum the exposure of the oil to air.

I have proved that both the hydrogen and the catalyst are necessary for the success of the process. Thus, by making all other conditions (i. e., the oil, the catalyst, the temperature, the pressure and the time) the same, but substituting for the hydrogen an inert gas (e. g., carbon dioxide), I have found that deodorization failed. Also, when, without other change, the catalyst was omitted, I obtained no deodorization.

The degree of hydrogenation of unsaturated glycerides, as measured by the fall in the iodine number, is a function of the catalyst, the time and the temperature (at atmospheric pressure) and does not bear a direct relation to the degree of deodorization, so far as this last is susceptible of quantitative evaluation. The following are some figures obtained in actual practice. In each case the oil was satisfactorily deodorized. The original oils varied in iodine number from 160 to 165.

(1) Nickel catalyst, 2 per cent on weight of oil; temperature and time, 2 hours at room temperature, 13½ hours at 50° C.,—iodine number 162.

(2) Palladium catalyst, about 1 per cent on weight of oil, 2 hours at room temperature,—iodine number 164.

(3) Mixed catalyst, nickel and palladium, 3 hours at about 30° C.,—iodine number 166.

(4) As (3) 5 hours,—iodine number 161.
(5) Continuation of (4) plus 10 hours at average temperature of 17° C.,—iodine number 114.6. On chilling the oil and separating the liquid portion had an iodine number of 152. This was a case where the operation was intentionally prolonged many hours beyond the correct period.

The iodine numbers of medicinal cod liver oils vary between 135 and 180; 160 is a common figure.

The treated oil gives the color reactions characteristic of cod liver oil: (1) If to 5 c. c. of carbon tetrachloride (cooled) one drop of the oil be added and then one drop of strong sulphuric acid and a fine violet color develops on shaking. (2) To 0.2 c. c. of a 20 per cent solution of the oil in anhydrous chloroform, add 2 c. c. of a 30 per cent solution of antimony trichloride in chloroform. A bright blue color is produced.

According to the prevalent opinion these two reactions are indicative of the presence of vitamin A, and to some extent, the intensity of color reaction can be regarded as a measure of the quantity of this vitamin present in the oil.

The oil treated according to this invention is palatable. It is devoid of the fishy flavor of the original oil or retains it in a negligible and unobjectionable degree. It may be used for medicinal purposes in the customary manner as an oil or it may be made into an emulsion, but the absence of the strong fishy flavor extends the utility of this oil beyond the strictly medicinal field.

While it is often not difficult to accustom infants to the taking of ordinary cod liver oil, older children and adults usually exhibit repugnance to the flavor and to the oily consistency. Nor does an oil with such a flavor lend itself to the preparation of food products for the use of growing children, pregnant women and others in special need of vitamins A and D. The deodorized oil can, however, advantageously be used in this way, especially in emulsion forms.

The first type of emulsion is of the pharmaceutical kind. I prepare this kind of emulsion in any of the standard ways. It is preferable to avoid the use of gum acacia or agar-agar as emulsifying agents because these substances may contain oxidizing ferments destructive of the vitamins. Casein or saccharated casein may be used and gum tragacanth is satisfactory.

The following formula may be used:

Deodorized oil_____ 20 parts by weight
Mucilage of tragacanth_ 80 parts by weight Flavoring to taste. Emulsify.

When using the "continental" method of emulsion making I use gum tragacanth instead of the mucilage. I heat the dry gum to 50° C. and powder it fine in a dry hot mortar. To this I add the oil and triturate, proceeding in the usual manner.

A second type of emulsion of creamy consistency may be produced by mixing the first described emulsion with milk and adding any desired flavoring. The nucleus for this kind of emulsion may also be made with casein as the emulsifying agent in the proportions oil 3 parts, saccharated casein 3 parts, water 1 part; all by weight. This nucleus may be diluted wth milk and flavored.

A third type of emulsion is a water in oil emulsion having the consistency of butter. Such a product may be made from the cod liver oil exclusively, if desired. To effect this, part of the oil is hydrogenated only to the point of sufficient deodorization. The rest of the oil is hydrogenated to a melting point of about 40° C. The proportion of the one constituent to the other depends on the melting point required in the final product. This is subject to seasonal and climatic variation. A common melting point is 25° C. The mixture so adjusted is melted and churned into soured pasteurized milk and treated according to the standard practice for oleomargarine manufacture. It is however, preferable, to use as the higher melting constituent the ordinary harder fats that enter into the composition of oleomargarine and similar products. Any proportion of the deodorized oil may be used in substitution for a corresponding proportion of the ordinary oils. In this way is produced an edible fat of butter consistency, enriched in the readily assimilated glycerides of the highly unsaturated acids, as well as in vitamins.

A fourth type of emulsion may be made from the deodorized oil by substituting it for all or any proportion of the oil used in making a mayonnaise sauce. There are many recipes for this kind of emulsion. The following serves as an example. The parts are by weight:

Egg yolk, thoroughly beaten_____ 60
Salt_____ 5
Sugar_____ 5
Lemon juice or vinegar_____ 30
Oil_____ 150

Add the constituents gradually in the order in which they are mentioned while beating continuously and evenly. If premature thickening occurs augment the proportion of lemon juice or vinegar before completing the addition of the oil. Flavoring may be added as usual.

To recapitulate, the marine oils are largely composed of glycerides of highly unsaturated acids, such as clupanodonic acid. There is a large body of competent opinion which holds that these glycerides are of especial value in malnutrition. In addition, some of these oils, and particularly cod liver oil, contain phosphorus compounds, iodine compounds and other substances to which therapeutic value is attributed by some. Lastly, some of these oils, more especially cod liver oil, are rich in vitamins. Unfortunately all these oils have a strong fishy flavor. My invention is founded on the discovery that by accurate control of hydrogenation, a control relating to choice of catalyst, to pressure, to time and to temperature, a sufficient degree of deodorization can be attained before any substantial destruction of vitamins or hydrogenation of highly unsaturated glycerides has occurred. The object of my invention is first to render these oils palatable without destruction of the highly unsaturated glycerides, of the vitamins, or of the other possibly valuable constituents, and second, to render these substances available in a still more palatable form by making them into emulsions of various kinds.

Having described my invention I claim as new and desire to secure by Letters Patent:

1. A clear liquid partially hydrogenated cod liver oil product of brilliant yellow color, which deposits no substantially solid glycerides upon chilling and which contains glycerides of highly unsaturated acids and substantially its original vitamin content.

2. In a process which comprises treating cod liver oil and other marine oils to produce products that are substantially deodorized and which contain glycerides of the highly unsaturated acids and the vitamins preserved substantially unimpaired, the step of treating such oils with hydrogen in the presence of a catalyst selected from the group containing palladium, platinum and nickel and copper-nickel at a temperature below 80° C. until the product is but partially hydrogenated so that no substantial amount of solid glycerides is deposited on chilling and its original vitamin content is retained substantially unimpaired.

H. O. NOLAN.